(12) United States Patent
Klaus

(10) Patent No.: US 9,137,422 B2
(45) Date of Patent: Sep. 15, 2015

(54) IMAGE PROCESSING IN CONTONE SPACE AND HALFTONE SPACE

(75) Inventor: Richard I. Klaus, Ridgefield, WA (US)

(73) Assignee: Marvell International Ltd., Hamilton (BM)

( * ) Notice: Subject to any disclaimer, the term of this patent is extended or adjusted under 35 U.S.C. 154(b) by 470 days.

(21) Appl. No.: 13/316,326

(22) Filed: Dec. 9, 2011

(65) Prior Publication Data

US 2012/0162719 A1 Jun. 28, 2012

Related U.S. Application Data

(60) Provisional application No. 61/427,018, filed on Dec. 23, 2010, provisional application No. 61/441,603, filed on Feb. 10, 2011.

(51) Int. Cl.
 *H04N 1/52* (2006.01)
 *H04N 1/405* (2006.01)

(52) U.S. Cl.
 CPC .............. *H04N 1/52* (2013.01); *H04N 1/4051* (2013.01)

(58) Field of Classification Search
 CPC ...................... G06K 15/1881; G06K 15/1876
 See application file for complete search history.

(56) References Cited

U.S. PATENT DOCUMENTS

| 6,361,144 | B1 * | 3/2002 | Torpey et al. ................... 347/43 |
| 7,239,430 | B2 * | 7/2007 | Shiau et al. .................. 358/3.08 |
| 7,627,191 | B2 | 12/2009 | Xu et al. |
| 7,719,719 | B2 | 5/2010 | Loce et al. |
| 8,885,223 | B1 * | 11/2014 | Keithley et al. .............. 358/3.22 |
| 2004/0001228 | A1 * | 1/2004 | Goto et al. ..................... 358/2.1 |
| 2005/0018918 | A1 | 1/2005 | Keithley |
| 2005/0237359 | A1 * | 10/2005 | Yoshida .......................... 347/43 |
| 2007/0139716 | A1 * | 6/2007 | Chen ............................ 358/3.27 |
| 2007/0291065 | A1 * | 12/2007 | Shibata et al. .................. 347/15 |
| 2007/0296990 | A1 * | 12/2007 | Kakutani ....................... 358/1.9 |
| 2008/0130024 | A1 * | 6/2008 | Kakutani ....................... 358/1.9 |
| 2008/0278764 | A1 * | 11/2008 | Hirano et al. ................ 358/3.13 |
| 2009/0225373 | A1 | 9/2009 | Moriwaki |
| 2010/0231940 | A1 | 9/2010 | Kaima |
| 2011/0243429 | A1 * | 10/2011 | Yao ............................... 382/162 |

FOREIGN PATENT DOCUMENTS

EP 1191784 3/2002

* cited by examiner

*Primary Examiner* — Nicholas Pachol

(57) ABSTRACT

Embodiments provide a method comprising receiving a halftone image, the halftone image comprising a plurality of pixels, each pixel of the plurality of pixels including pixel data associated with a plurality of color planes; forming a pixel group, the pixel group including (i) a target pixel and (ii) one or more pixels that are neighboring to the target pixel; generating a pixel window for the pixel group; comparing the pixel window with a plurality of candidate patterns; determining that the pixel window matches with at least one of the plurality of candidate patterns; and based on determining that the pixel window matches with at least one of the plurality of candidate patterns, performing an image processing operation on the pixel group.

14 Claims, 10 Drawing Sheets

Pixel group 204

| A23 01 | A24 11 | A25 11 |
|---|---|---|
| A33 01 | A34 10 | A35 00 |
| A43 11 | A44 11 | A45 01 |

Color plane pixel window 26A for color plane CA

Threshold pixel data of pixel A34 for the color plane CA

Fig. 3A

Pixel group 204

| A23 11 | A24 01 | A25 11 |
|---|---|---|
| A33 01 | A34 11 | A35 01 |
| A43 00 | A44 10 | A45 01 |

Color plane pixel window 26B for color plane CB

Threshold pixel data of pixel A34 for the color plane CB

Fig. 3B

Pixel group 204

| A23 01 | A24 11 | A25 11 |
|---|---|---|
| A33 01 | A34 10 | A35 00 |
| A43 11 | A44 11 | A45 01 |

Pixel window 40

Fig. 4

| 01 | x  | x  |
|----|----|----|
| 01 | 10 | x  |
| 11 | 11 | 01 |

Candidate pattern 500a

Fig. 5A

| x  | 01 | 01 |
|----|----|----|
| x  | 10 | 11 |
| x  | 10 | 01 |

Candidate pattern 500b

Fig. 5B

| 01 | 11 | 11 |
|----|----|----|
| 01 | 10 | 00 |
| x  | x  | x  |

Candidate pattern 500c

IMAGE PROCESSING IN CONTONE SPACE AND HALFTONE SPACE

CROSS-REFERENCES TO RELATED APPLICATIONS

The present disclosure claims priority to U.S. Provisional Patent Application No. 61/427,018 filed Dec. 23, 2010, and to U.S. Provisional Patent Application No. 61/441,603 filed Feb. 10, 2011, the entire disclosures of which are hereby incorporated by reference in their entireties except for those sections, if any, that are inconsistent with this disclosure. The present disclosure is related to U.S. patent application Ser. No. 13/316,316, which is filed concurrently with the present disclosure.

TECHNICAL FIELD

Embodiments of the present disclosure relate to the field of image processing, and more particularly, to image processing in contone space and halftone space.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In order to facilitate the printing of images in a printing device, an image having continuous tones (also referred to as a "continuous tone image" or a "contone image") is often converted into an image having halftones (also referred to as a "halftone image"). Various image processing operations are generally performed in an image prior to, for example, the image is printed in a printing device. Examples of image processing operations include, but are not limited to, black depletion, black fortification, bleed reduction, edge detection and/or the like.

SUMMARY

In various embodiments, there is provided a method for processing a continuous tone (contone) image, the method comprising receiving the contone image, wherein the contone image comprises a plurality of pixels, wherein each pixel of the plurality of pixels comprises pixel data associated with a plurality of color planes; forming a pixel group, the pixel group including a target pixel and one or more pixels that are neighboring to the target pixel; for each pixel in the pixel group and for each of one or more color planes of the plurality of color planes, comparing pixel data of the corresponding pixel for the corresponding color plane with one or more threshold levels to generate threshold pixel data; based on the threshold pixel data of the pixels in the pixel group for the one or more color planes, generating one or more color plane pixel windows for the pixel group corresponding to the one or more color planes; and based on the one or more color plane pixel windows, generating a pixel window for the pixel group.

In various embodiments, there is also provided an image processing system for processing a contone image comprising a plurality of pixels, wherein each pixel of the plurality of pixels includes pixel data associated with a plurality of color planes, the image processing system comprising a threshold function module configured to receive a contone image, form a pixel group, wherein the pixel group includes (i) a target pixel and (ii) one or more pixels that are neighboring to the target pixel, for each pixel in the pixel group and for each of one or more color planes of the plurality of color planes, compare pixel data of the corresponding pixel for the corresponding color plane with one or more threshold levels to generate threshold pixel data, and based on the threshold pixel data of the pixels in the pixel group for the one or more color planes, generate one or more color plane pixel windows for the pixel group corresponding to the one or more color planes; and a window generation module configured to, based on the one or more color plane pixel windows, generate a pixel window for the pixel group.

In various embodiments, there is also provided a method comprising receiving a halftone image, the halftone image comprising a plurality of pixels, each pixel of the plurality of pixels including pixel data associated with a plurality of color planes; forming a pixel group, the pixel group including (i) a target pixel and (ii) one or more pixels that are neighboring to the target pixel; generating a pixel window for the pixel group; comparing the pixel window with a plurality of candidate patterns; determining that the pixel window matches with at least one of the plurality of candidate patterns; and based on determining that the pixel window matches with at least one of the plurality of candidate patterns, performing an image processing operation on the pixel group.

In various embodiments, there is provided an image processing system for processing a halftone image comprising a plurality of pixels, wherein each pixel of the plurality of pixels includes pixel data associated with a plurality of color planes, the image processing system comprising a window generation module configured to form a pixel group, the pixel group including (i) a target pixel and (ii) one or more pixels that are neighboring to the target pixel, and generate a pixel window for the pixel group; a pattern matching module configured to compare the pixel window with a plurality of candidate patterns, and determine that the pixel window matches with at least one of the plurality of candidate patterns; and a data modification module configured to, based on determining that the pixel window matches with at least one of the plurality of candidate patterns, perform an image processing operation on the pixel group.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 3A illustrates a pixel window for a color plane corresponding to pixels of a pixel group, in accordance with various embodiments.

FIG. 3B illustrates a pixel window for another color plane corresponding to pixels of the pixel group, in accordance with various embodiments.

FIG. 4 illustrates an example of a pixel window, in accordance with various embodiments FIGS. 5A-5C illustrates three example candidate patterns, in accordance with various embodiments.

Figures 6A, 6B, 6C, 6D:
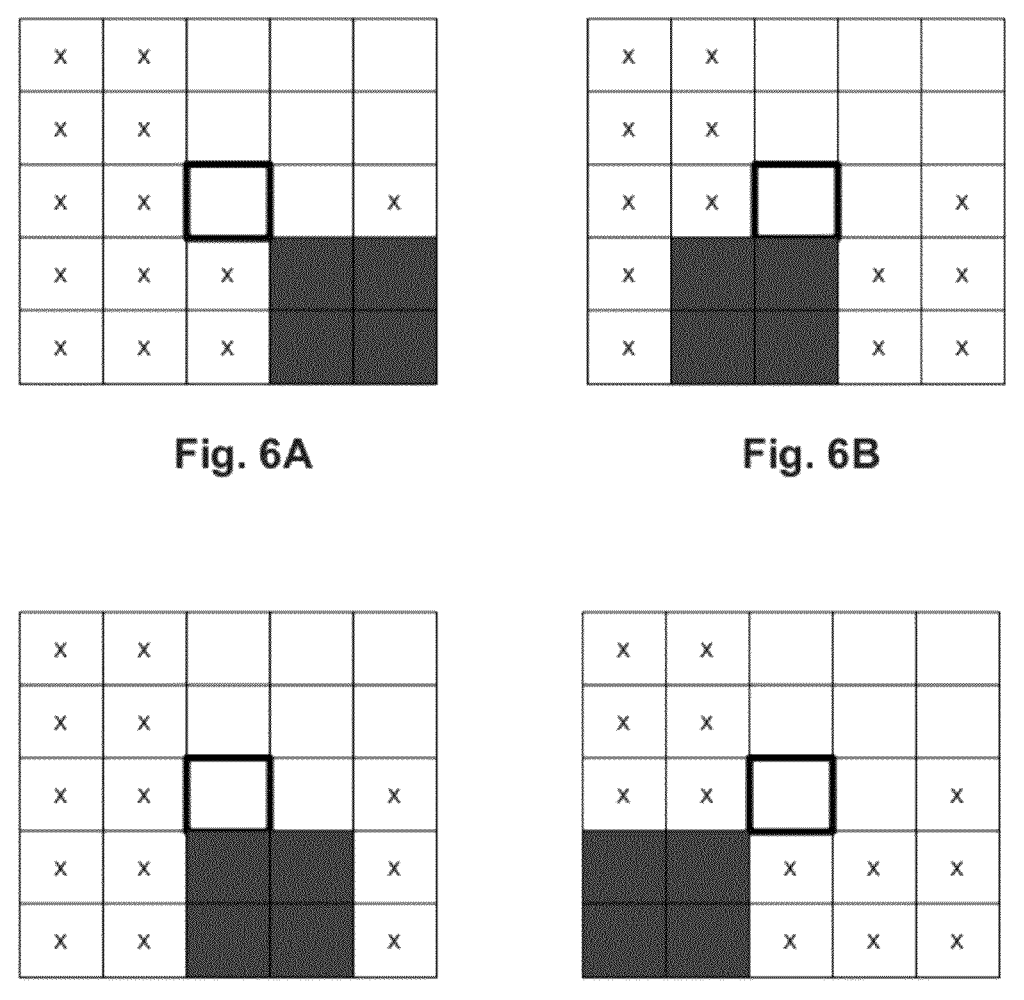
Figures 7A, 7B, 7C, 7D:
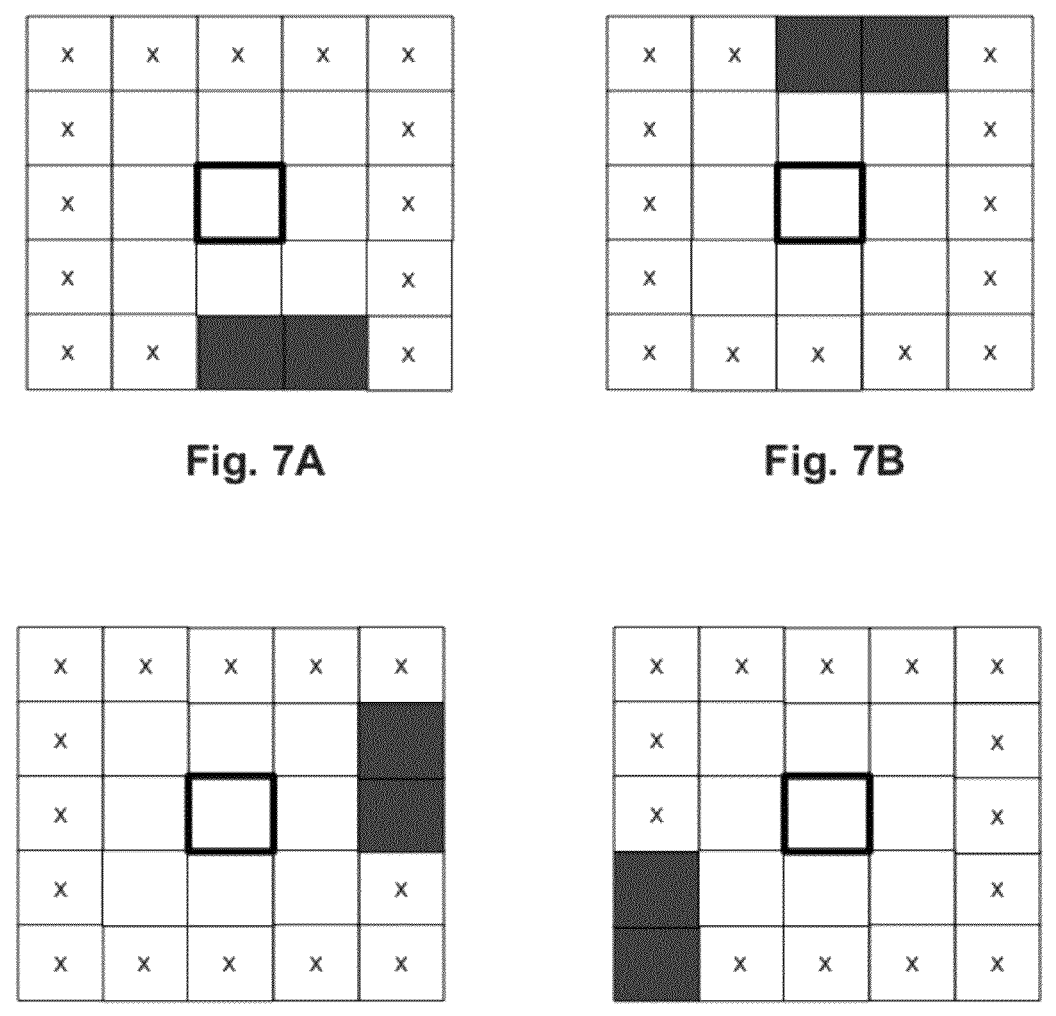

FIGS. 6A-6D and 7A-7D illustrate example candidate patterns that are used for a bleed reduction operation.

DETAILED DESCRIPTION

Figure 1:
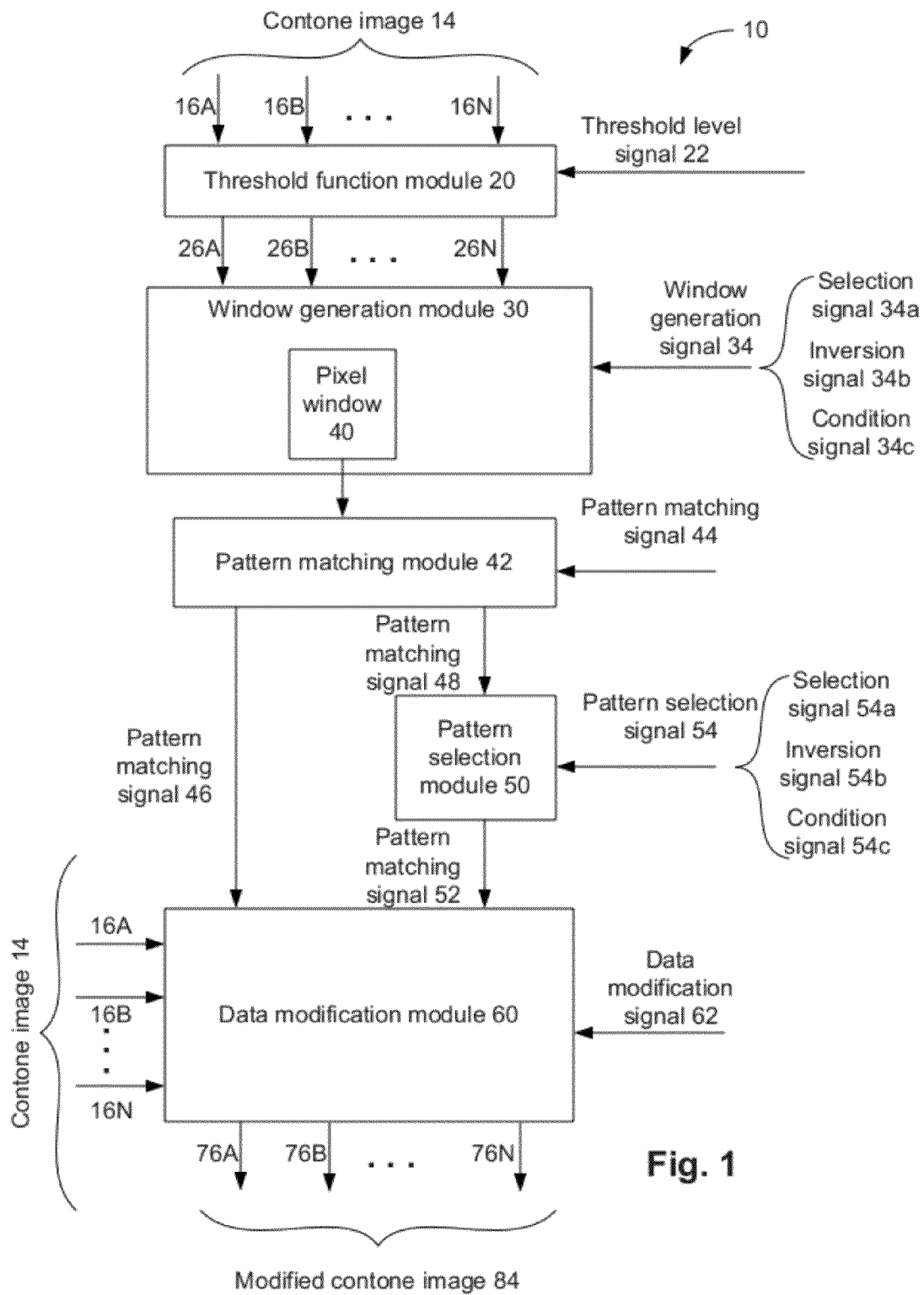
FIG. 1 schematically illustrates an image processing system, in accordance with various embodiments.

FIG. 1 schematically illustrates an image processing system 10 (referred to hereinafter as "system 10"), in accordance with various embodiments. The system 10 processes, for example, contone images, and performs one or more image processing operations on the contone images. In an embodiment, the system 10 receives a contone image 14, processes the contone image 14, and outputs a modified contone image 84 based on having processed the contone image 14. In an embodiment, the system 10 is implemented in a printing device, and the system 10 processes the contone image 14 prior to printing the contone image 14.

In an embodiment, the contone image 14 includes a plurality of color planes, e.g., color planes CA, . . . , CN, where N is an appropriate integer. In an example, the contone image 14 includes cyan (C), magenta (M), yellow (Y) and black (K) color planes (i.e., CMYK color planes), in which case N is equal to four. In another example, the contone image 14 includes C color plane, M color plane, Y color plane, K color plane, light C color plane, and light M color plane, in which case N is equal to six. In yet another example, the contone image 14 includes one or more other color planes, e.g., text black color plane, gloss color plane, and/or the like.

Figure 2:
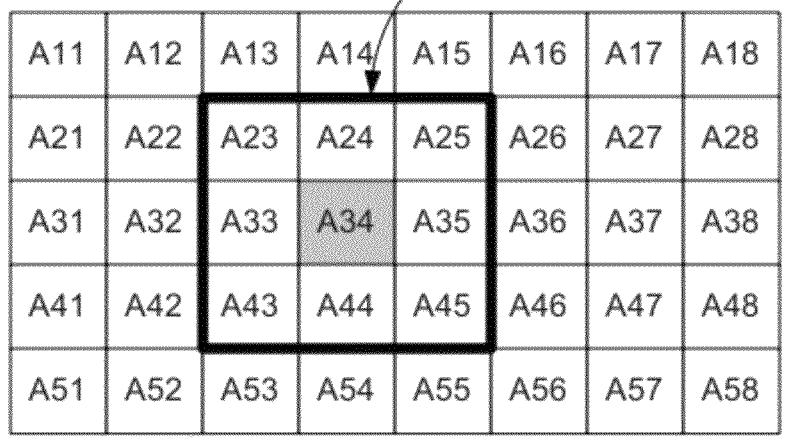
FIG. 2 illustrates a portion of a contone image, in accordance with various embodiments.

FIG. 2 illustrates a portion 200 of the contone image 14, in accordance with various embodiments. The portion 200 of the contone image 14 includes a plurality of pixels, e.g., pixels A11, A12, . . . , A58. In FIG. 2, a pixel A34 is selected as a target pixel. The target pixel A34 and a plurality of pixels neighboring to the target pixel A34 are selected to form a pixel group 204. The target pixel A34 is, for example, a pixel located in the center of the pixel group 204. Although FIG. 2 illustrates the pixel group 204 as a 3×3 array of pixels, in various other embodiments, the pixel group 204 can consist of a different number of pixels (e.g., 5×5 array of pixels, 7×7 array of pixels, or the like). As will be discussed in more detail herein, one or more image processing operations on the target pixel A34 is performed based on pixel information (or pixel data) associated with one or more other pixels of the pixel group 204.

In an embodiment, each pixel of the contone image 14 includes pixel data associated with each of the N color planes. For example, a pixel of the contone image 14 includes pixel data associated with the color plane CA, pixel data associated with the color plane CB, and so on. In FIG. 1, pixel data of the pixels of the contone image 40 associated with the color plane CA is represented by 16A; pixel data of the pixels of the contone image 40 associated with the color plane CN is represented by 16N, and so on. Thus, the contone image 14 includes pixel data 16A for the color plane CA, pixel data 16N for the color plane CN, and so on. In an example, pixel data of a pixel, for each color plane, is represented by 8 bits, 10 bits, or the like.

Referring again to FIG. 1, the system 10 includes a threshold function module 20 that is configured to receive the contone image 14 (e.g., receive pixel data 16A, . . . , 16N). In an embodiment, for each pixel of the contone image 14 and for each of the color planes CA, . . . , CN, the threshold function module 20 compares pixel data of the corresponding pixel for the corresponding color plane with one or more threshold levels to determine threshold pixel data. Threshold pixel data for a pixel, for each color plane, is, for example, represented by 1 bit, 2 bits, or the like. In an embodiment, for each color plane, threshold pixel data for the pixels of the pixel group 204 form a pixel window corresponding to the color plane (also referred to herein as a "color plane pixel window". For example, FIG. 3A illustrates a color plane pixel window 26A for the color plane CA corresponding to the pixels of the pixel group 204, in accordance with various embodiments. FIG. 3B illustrates a color plane pixel window 26B for the color plane CB corresponding to the pixels of the pixel group 204, in accordance with various embodiments.

For example, the threshold function module 20 receives pixel data 16A, corresponding to the color plane CA, for pixels of the pixel group 204. In an embodiment, the pixel data of a pixel for a color plane (e.g., color plane CA) is represented by 10 bits (i.e., ranges from 0 to 1023). The pixel data of a given pixel and for the color plane CA is compared to one or more threshold levels, e.g., threshold levels 128, 512, and 768, to generate threshold pixel data of the given pixel for the color plane CA. For example, if the pixel data of the given pixel for the color plane CA is less than 128, the threshold pixel data of the given pixel for the color plane CA is 00; if the pixel data of the given pixel for the color plane CA is greater than 128 and less than 512, the threshold pixel data of the given pixel for the color plane CA is 01; if the pixel data of the given pixel for the color plane CA is greater than 512 and less than 768, the threshold pixel data of the given pixel for the color plane CA is 10; and if the pixel data of the given pixel for the color plane CA is greater than 768, the threshold pixel data of the given pixel for the color CA plane is 11. Referring to FIG. 3A, the color plane pixel window 26A illustrates threshold pixel data of various pixels included in the pixel group 204, for the color plane CA. As an example, the threshold pixel data of the pixel A34 for the color plane CA is 10, which implies that the pixel data of the pixel A34 for the color plane CA is greater than 512 and less than 768. The number of threshold levels (e.g., three) and the value of thresholds levels (e.g., 128, 512 and 768) discussed with respect to the color plane CA is merely an example, and various other number and/or values of threshold levels may be used in various other embodiments.

In an embodiment, similar to generating the color plane pixel window 26A for the color plane CA, color plane pixel windows for various other color planes are also generated by the threshold function module 20 by comparing pixel data of various pixels for various other color planes with corresponding threshold levels. For example, color plane pixel window 26B (as illustrated in FIG. 3B) for color plane CB is generated by the threshold function module 20 by comparing pixel data of various pixels in the pixel group 204 for the color plane CB with threshold levels associated with the color plane CB. In the previously discussed example, three threshold levels of 128, 512 and 768 are associated with the color plane CA. A number and values of threshold levels associated with the color plane CB may be similar, or different, compared to those associated with the color plane CA. In an example, three threshold levels of 128, 256 and 768 are associated with the color plane CB. In another example, only one threshold level of 512 is associated with the color plane CB. In an example, a number and values of the threshold levels associated with a given color plane are based on, for example, an image processing application for which the color plane pixel windows are generated, a desired level of granularity for the threshold pixel values associated with the given color plane, and/or the like. In an embodiment, the number and values of the threshold levels associated with the given color plane are configurable or programmable based on, for example, the associated image processing application.

In an embodiment and referring again to FIG. 1, the threshold function module 20 receives a threshold level signal 22 (e.g., from an image processing controller, not illustrated in FIG. 1), which includes the threshold levels for various color planes. In an embodiment and although not illustrated in FIGS. 3A and 3B, color plane pixel windows 26C, . . . , 26N are also generated corresponding to the color planes CC, . . . , CN, respectively.

Referring again to FIG. 1, the system 10 also includes a window generation module 30. In an embodiment, the threshold function module 20 transmits the color plane pixel windows (e.g., color plane pixel windows 26A, 26B, . . . , 26N) for various color planes to the window generation module 30. In another embodiment and although not illustrated in FIG. 1, the threshold function module 20 transmits the threshold pixel values of various pixels for various color planes to the window generation module 30, and the window generation module 30 subsequently generates the color plane pixel windows (e.g., color plane pixel windows 26A, 26B, . . . , 26N) for various color planes.

The window generation module 30 generates a pixel window 40 based at least in part on one or more of the color plane pixel windows 26A, . . . , 26N. The window generation module 30 receives a window generation signal 34, which includes one or more of a selection signal 34a, an inversion signal 34b, and a conditional signal 34c. The selection signal 34a identifies one or more of the color plane pixel windows 26A, . . . , 26N that are to be selected to generate the pixel window 40. For example, for a first image processing operation, color plane pixel windows 26A, 26C may be selected to generate the pixel window 40; while for a second image processing operation, color plane pixel windows 26B, 26N may be selected to generate the pixel window 40.

The inversion signal 34b indicates if threshold pixel values of a selected color plane pixel window has to be inverted for generating the pixel window 40. The condition signal 34c includes one or more conditional operations (e.g., a conditional AND operation, a conditional OR operation, etc.) to be performed on the selected (and possibly inversed) color plane pixel windows.

As an example, an image processing operation specifies that (i) if the target pixel A34 has a pixel data that is more than 512 for the color plane CA and (ii) if pixel data of all the neighboring pixels in the pixel group 204 for the color plane CB are not greater than 128, then generate the window 40 such that the window 40 has threshold pixel values of the pixels in the pixel group 204 for the color plane CA. To generate the pixel window 40 under such a condition, the selection signal 34a selects the color plane pixel windows 26A and 26B (e.g., corresponding to the color planes CA and CB). The inversion signal 34b inverts the color plane pixel window 26B (e.g., to determine if pixel data of all the neighboring pixels in the pixel group 204 for the color plane CB are "not" greater than 128). The conditional signal 34c performs a conditional ANDing of the two sub-conditions to determine if the pixel window 40 is to be generated as per the above condition. In an example, if the above condition is satisfied, the pixel window 40 will be similar to the color plane pixel window 26A of FIG. 3A. FIG. 4 illustrates an example of the pixel window 40, in accordance with various embodiments.

Referring again to FIG. 1, the system 10 includes a pattern matching module 42, which receives the pixel window 40 from the window generation module 30. In an embodiment, the pattern matching module 42 searches for patterns in the pixel window 40. The pattern matching module 42 receives a pattern matching signal 44 (e.g., from an image processing controller, not illustrated in FIG. 1), and generates a pattern matching signal 46 and a pattern matching signal 48.

In an embodiment, the pattern matching signal 44 includes a plurality of candidate patterns. For example, FIGS. 5A-5C illustrates three example candidate patterns 500a, 500b and 500c, respectively, in accordance with various embodiments. The candidate patterns illustrated in FIGS. 5A-5C are merely examples, and do not limit the teachings of this disclosure. Each of the candidate patterns 500a, 500b and 500c have pixels with 2 bit values, or have "don't care" conditions (illustrated by "x"). The plurality of candidate patterns in the pattern matching signal 44 is compared with the pixel window 40. If, for example, the pixel window 40 matches with one or more of the plurality of candidate patterns, the pattern matching signal 46 and/or the pattern matching signal 48 indicates the one or more of the plurality of candidate patterns that matches with the pixel window 40. Of the example candidate patterns 500a, 500b and 500c, two candidate patterns 500a and 500c matches the pixel window 40 of FIG. 4.

In an embodiment, in addition to, or instead of, matching the pixel window 40 with the candidate patterns, the pattern matching module 42 searches for patterns in the pixel window 40 in any other appropriate manner. In an example, the pattern matching module 42 determines if a center pixel (which corresponds to the target pixel A34) of the pixel window 40 is near an edge of a colored area in the pixel window 40. For example, if all the pixels in the top most row of the pixel window 40 have binary values 11, then the top most row of the pixel window 40 defines an edge of a colored area in the contone image 14. Accordingly, the pattern matching module 42 determines that the target pixel A34 is near the edge, and the pattern matching signal 46 indicates such determination.

When the pattern matching module 42 compares the pixel window 40 with the plurality of candidate patterns (e.g., candidate patterns 500a, 500b and 500c), more than one candidate patterns may match the pixel window 40. For example, the pixel window 40 matches the candidate patterns 500a and 500c. In an embodiment, if multiple candidate patterns match the pixel window 40, a pattern selection module 50 selects one of the multiple candidate patterns that match the pixel window 40. In another embodiment, if multiple candidate patterns match the pixel window 40, the pattern selection module 50 generates a candidate pattern based on the one or more candidate patterns that match the pixel window 40.

The pattern selection module 50 receives a pattern selection signal 54 and outputs a pattern matching signal 52. The pattern matching signal 52 includes the candidate pattern (or an identification of the candidate pattern) generated and/or selected by the pattern selection module 50.

In an embodiment, the pattern matching signal 54 comprises one or more of a selection signal 54a, an inversion signal 54b, and a conditional signal 54c. The selection signal 54a selects one or more of the candidate patterns that have matched with the pixel window 40, the inversion signal 54b optionally inverts one or more of the selected pattern, and the condition signal 54c indicates one or more conditional operations (e.g., a conditional AND operation, a conditional OR operation, etc.) to be performed on the selected (and optionally inverted) candidate patterns.

The system 10 also includes a data modification module 60. In an embodiment, the data modification module 60 receives a pattern (or an identification of the pattern) from the pattern matching module 42 and/or from the pattern selection module 50. Additionally or alternatively, the data modification module 60 receives other relevant information from the pattern matching module 42 (e.g., a distance of the target pixel A34 from an edge of a black area). The data modification module 60 also receives the original contone image 14 and a data modification signal 62 (e.g., from an image processing controller, not illustrated in FIG. 1). The data modification module 60 modifies the contone image 14 to generate a modified contone image 84, based at least in part on (i) the information received from the pattern matching module 42 (or the pattern selection module 50) and (ii) the data modification signal 62.

As an example, the data modification signal 62 received by the data modification module 60 includes one or more parameters used to modify the contone image 14. The data modification signal 62 is based on a type of image processing operation performed by the system 10. For example, if the system 10 is used for a black fortification operation, pixel data of one or more pixels for the black color plane of the contone image 14 are modified by the data modification module 60. In an embodiment, the modified contone image 84 includes pixel data 76A, ..., 76N of various pixels, corresponding to the color planes CA, ..., CN, respectively, as illustrated in FIG. 1.

There are several advantages of using the system 10 for performing various image processing operations. For example, as will be discussed herein, the system 10 is generic in nature, and can be configured to perform various types of image processing operations (either serially, or at least in part in parallel). Furthermore, the system 10 performs image processing operation on the contone image 14 (e.g., instead of a halftone image). As pixel data of a pixel for a color plane in a contone image is represented by, for example, 10 bits (i.e., ranges from 0 to 1023), it is relatively easy to precisely change (or slightly adjust) a value of the pixel data of the pixel for the color plane by, for example, 5%. In contrast, pixel data of a pixel for a color plane in a halftone image is represented by, for example, 1 bit or 2 bits. So, it is generally not possible to modify the pixel data of the pixel for the color plane in the halftone image by, for example, 5%. Accordingly, the system 10 can be configured to make precise modification on the contone image 14 based on an image processing operation performed by the system 10.

Multiple Image Processing Operations Using the System 10

The system 10 can be used for performing more than one image processing operation. As an example, the system 10 is used for performing a first image processing operation and a second image processing operation. As an example, the first and second image processing operations are two of a black depletion operation, a black fortification operation, a fixer bloom operation, a bleed reduction operation, a text merge operation, a text enhancement operation, and/or the like. In another embodiment, the system 10 can be used be perform any other appropriate number or type of image processing operations.

For example, for the first image processing operation, the threshold function module 20 uses a first set of threshold levels for various color planes to generate the threshold pixel values for various pixels. For the second image processing operation, the threshold function module 20 uses a second set of threshold levels for various color planes to generate the threshold pixel values for various pixels. In an embodiment, the first set and the second set of threshold levels are independent of each other, and different from each other. In another embodiment, the first set and the second set of threshold levels are the same.

If the first set and the second set of threshold levels are the same, the threshold function module 20 generates a common set of color plane pixel windows for both the first and second image processing operations. If the first set and the second set of threshold levels are different, the threshold function module 20 generates a first and a second set of color plane pixel windows for the first and second image processing operations, respectively. For example, the first set of color plane pixel windows includes the color plane pixel windows 26A, ..., 26N, as illustrated in FIGS. 1 and 3A-3B. Although not illustrated in FIG. 1, the second set of color plane pixel windows similarly includes one or more color plane pixel windows.

In an embodiment, the window generation module 30 generates a first pixel window and a second pixel window for the first and second image processing operations, respectively, based on the respective set of color plane pixel windows. If the first and second image processing operations have the common set of color plane pixel windows, the generated first pixel window and the second pixel window may be the same (e.g., depending on the type of the first and second image processing operations).

The pattern matching module 42 and/or the pattern selection module 50 similarly generate a first pattern and a second pattern corresponding to the first and second image processing operations, respectively. In an embodiment, the data modification module 60 receives the first and second patterns, and modifies the contone image 14 based on the first and second patterns (i.e., implements the first and second image processing operations) to generate the modified contone image 84.

Thus, the system 10 can be used for performing a single image processing operation, or for performing more than one image processing operations. A plurality of image processing operations is discussed below. In an embodiment, each of these image processing operations can be performed as a stand-alone application in the system 10. In another embodiment, more than one of these image processing operations can be performed (e.g., performed at least in part in parallel) using the system 10.

Example Image Processing Operation: Black Depletion

In an embodiment, an edge in a contone image refers to a boundary between two different colors in the contone image. For example, referring to the portion 200 of the contone image 14, if pixels A11, A21, ..., A51, A12, A22, ..., A52 have black color, and the remaining pixels in the portion 200 have another color (e.g., white color), then the pixels A11, A21, ..., A51, A12, A22, ..., A52 define a black area (or at least a part of the black area) in the contone image 14 and the pixels A12, A22, ..., A52 define an edge of the black area in the contone image 14.

In an embodiment, a black depletion operation is performed to preserve an edge of a black area in the contone image 14, while reducing an amount of ink on an interior of the black area. Black depletion operation, for example, improves ink dry time for a relatively small reduction in black optical density in the black area in a printout of the image.

In an embodiment, to implement the black depletion operation, the threshold function module 20 compares pixel data of various pixels for the black color plane with threshold levels corresponding to the black color plane. Based on the comparison, the threshold function module 20 generates a color plane pixel window for the black color plane. In an example, the pixel data of each pixel for the black color plane is represented by 10 bits (i.e., ranging from 0 to 1023). In an embodiment, the black depletion operation is performed on black areas that have relatively high black color tone. Accordingly, a single threshold level close to 1023 (e.g., 1000) is set for the black color plane. Pixel data of various pixels for the black color plane is compared to this threshold level to generate the threshold pixel data for the various pixels for the black color plane, and to generate the corresponding black color plane pixel window. As only one threshold level is used, the threshold pixel data for the black color plane is either 0 or 1 for each pixel (i.e., the threshold pixel data comprises one bit only). In an embodiment, color plane pixel windows for other color planes (e.g., other than black color planes) are not generated while performing the black depletion operation. In another embodiment, color plane pixel windows for the other color planes are generated, but are not selected by the window generation module 30 (e.g., based on the selection signal 34*a*) while generating the pixel window for the black depletion operation. As only one color plane pixel window is selected, the condition signal 34*c* and/or the inversion signal 34*b* may not be used in the black depletion operation.

In an embodiment, the pattern matching module 42 searches for black edges and black interior areas in the pixel window while performing the black depletion operation. For example, the pattern matching module 42 determines if the target pixel A34 is at an edge of a black area, outside a black area, or in an interior of a black area of the contone image 14. The target pixel A34 is in the interior of the black area if, for example, the target pixel A34 is surrounded by black pixels, and the nearest edge is at least, for example, 3 pixels away from the target pixel A34. If the target pixel A34 is not in the interior of the black area (e.g., if the target pixel A34 is at an edge or outside the black area), no modification to the target pixel A34 is carried out by the data modification module 60 as a part of the black depletion operation. However, if the target pixel A34 is in the interior of the black area of the contone image 14, the data modification module 60 reduces the pixel data of the target pixel A34 for the black color plane while modifying the contone image 14. For example, if the pixel data of the target pixel A34 for the black color plane is 1023 and the target pixel A34 is found to be in the interior of the black area, the pixel data of the target pixel A34 for the black color plane is modified to be 75% of its original pixel data (i.e., 767) in the modified contone image 84.

Example Image Processing Operation: Black Fortification

In an embodiment, a black fortification operation is performed to add color ink underneath black ink to improve optical density and/or reduce smudging while printing the contone image 14. To avoid generating a color "halo" around black characters, the black fortification operation is performed only underneath black areas that are in the interior of the black area (and not near the edges of the black area).

In an embodiment, the threshold levels of the black color plane, generation of the pixel window and/or generation of the pattern by the pattern matching module 42 for the black fortification operation is at least in part similar to those carried out for the black depletion operation. For example, in the black fortification operation, it is determined if the target pixel is in the interior of a black area of the contone image 14. However, the data modification module 60 operates in a different manner for the black fortification operation, compared to the black depletion operation. For example, in the black depletion operation, the pixel data of the target pixel for the black color plane is reduced. On the other hand, in the black fortification operation, pixel data of the target pixel for one or more other color planes (i.e., other than the black color plane) is fortified or enhanced if the target pixel is in the interior of a black area. As an example, 5% cyan color and 10% magenta color (wherein the percentages are expressed with respect to the maximum values of the pixel data for the respective color planes) are added to pixels that are in the interior of the black areas. Accordingly, in the modified contone image 84, pixel data of the target pixel for the cyan color plane and the magenta color planes are enhanced and set to 51 and 102, respectively. If the pixel data of the target pixel for the cyan color plane and the magenta color planes were originally higher than 51 and 102, respectively, in the original contone image 14, then the pixel data of the target pixel for the cyan color plane and the magenta color planes are, for example, not modified.

In an embodiment, as the black depletion operation and the black fortification operation utilizes similar threshold levels, similar pixel windows and similar pattern matching, in an embodiment, common threshold levels, a common pixel window and a common pattern matching are used for both the black depletion operation and the black fortification operation in the system 10.

Example Image Processing Operation: Bleed Reduction

In an embodiment, it may be desirable to reduce an amount of color and/or black ink in an area that is near a black edge (but outside a corresponding black area) in the contone image 14. Such a reduction is achieved through a bleed reduction operation. Bleed reduction results in, for example, relatively sharper edge in the contone image 14.

In an embodiment, in the bleed reduction operation, it is determined if the target pixel is near an edge of a black area (but external to the black area) of the contone image 14. The pixel data of various pixels for the black color plane are compared to one or more threshold levels (e.g., to two threshold levels of, for example, 100 and 1000 for 10 bit pixel data). The resulting color plane pixel window for the black color plane is used as the pixel window 40.

In an embodiment, the pixel window 40 for the bleed reduction operation is compared to a plurality of candidate patterns by the pattern matching module 42. Additionally or alternatively, the pattern matching module 42 searches for an edge of a black area in the vicinity of the target pixel, and determines how far the target pixel is from the edge of the black area.

For example, FIGS. 6A-6D and 7A-7D illustrate example candidate patterns that are used for bleed reduction operation. The target pixel in the candidate patterns of FIGS. 6A-6D and 7A-7D is the center pixel, and is illustrated using a dark outline. In the candidate patterns, the pixels for which the pixel data for the black color plane is greater than the threshold level of 1000 are marked using grey shades (indicating that these are black pixels), the pixels for which the pixel data for the black color plane is less than the threshold level of 100 are kept blank (indicating that these are non-black pixels), and the pixels that have "don't care" condition are marked using "x". Although only a few candidate patterns are illustrated in FIGS. 6A-6D and 7A-7D, there may be various other candidate patterns that are considered by the pattern matching module 42.

If the pixel window generated by the window generation module 30 matches with any of the candidate patterns of FIGS. 6A-6D, then the target pixel is one pixel away from an edge of a black area. If the pixel window matches with any of the candidate patterns of FIGS. 7A-7D, then the target pixel is two pixels away from an edge of a black area. Similar candidate patterns may also be generated to determine if the target pixel is three, four, or more pixels away from an edge of a black area.

In an embodiment, if the target pixel is near an edge of a black area (e.g., one, two or three pixels away from the black area), the pixel data of the target pixel is reduced (e.g., reduced by the data modification module 60, while generating the modified contone image 84) for one or more color planes (e.g., one or more of C, M and Y color planes) based on, for example, a distance of the target pixel from the edge. In an embodiment, the further the target pixel is from the edge, the less is the reduction of the pixel data of the target pixel.

If the target pixel is one pixel away from the edge of the black area, the pixel data of the target pixel is reduced, for example, to the greater of 205 or 25% (or by any other appropriate percentage) of its original pixel data for one or more color planes (e.g., cyan and magenta color planes). If the target pixel is two pixels away from the edge, the pixel data of the target pixel is reduced, for example, to 307 or to 40% of its original pixel data, whichever is greater. If the target pixel is three pixels away from the edge, the pixel data of the target pixel is reduced, for example, to 512 or 70% of its original pixel data, whichever is greater. In an embodiment, pixel data of one or more non-black color planes (e.g., cyan, magenta and/or yellow color planes) are reduced as a part of the bleed reduction operation, and pixel data of the black color plane are not reduced (e.g., to maintain sharp and crisp edges of text and other black areas).

Such reduction in the pixel data of the target pixel depletes ink distribution immediately next to an edge, and the ink distribution gradually ramps up to the original tone of the image with an increase of distance from the edge of the black area, thereby reducing color bleed in the print out of the contone image 14.

In an embodiment, a same pixel window is used for the black depletion operation, the black fortification operation, and the bleed reduction operation. For example, based on the same pixel window, the pattern matching module 42 determines if a target pixel is in an interior of a black area, on an edge of the black area, or outside (but near to) the black area. Based on the determination by the pattern matching module 42, the data modification module 60 modifies the contone image 14. For example, if the target pixel is near an edge of the black area (but outside of the black area), the data modification module 60 performs a bleed reduction operation. If the target pixel is in the interior of the black area, the data modification module 60 performs one or more of the black fortification operation and the black depletion operation.

Example Image Processing Operation: Fixer Bloom

While printing an image, a bonding agent, along with the ink, may be deposited on the printing media. The bonding agent, for example, helps adhere the ink to the printing media. However, due to a misalignment of nozzles that deposit the ink and the bonding agent, the bonding agent may land at a location that is different from a location where the ink lands.

In an embodiment, a fixer bloom operation aims to analyze a fixer color plane (which, for example, determines the locations in which the bonding agent is to be deposited) and expand the fixer color plane, if necessary, so that the bonding agent is present wherever ink is deposited.

A fixer color plane may, or may not be present in the original contone image 14. If a fixer color plane is already present in the contone image 14, the system 10 performs the fixer bloom operation by selectively blooming the previously generated fixer color plane of the contone image 14. Alternatively, the system 10 creates and blooms a fixer color plane in the contone image 14 if no fixer color plane already exists in the original contone image 14.

If the fixer color plane (e.g., which may be one of the color planes CA, ..., CN) is already present in the contone image 14, the window generation module 30 generates a pixel window based on the color plane pixel window of the fixer color plane only (e.g., color plane pixel windows for other color planes are not considered while generating the pixel window). The pattern matching module 42 receives a candidate pattern with all 0's (i.e., this candidate pattern matches the pixel window if the pixel window is blank). The pattern matching module 42 inverts the pattern, so that a match signal is generated if there is a non-zero value anywhere in the pixel window. If a match signal is generated, the data modification module 60 is configured to modify the fixer color plane of the target pixel of the contone image 14 with a desired fixer tone.

If no fixer color plane is present in the contone image 14, all the color plane pixel windows are considered while generating the pixel window for the fixer bloom operation. For example, the color plane pixel windows 26A, ..., 26N are considered while generating the pixel window for the fixer bloom operation. The condition signal 34c in this case performs an OR operation on the color plane pixel windows. For example, for a pixel, if any of the color plane pixel windows has a non-zero value, the pixel window is generated such that the corresponding location in the pixel window also has a non-zero value (e.g., 1). However, for the pixel, if all the color plane pixel windows have a zero value, the pixel window is generated such that the corresponding location in the pixel window also has a zero value. The pattern matching module 42 receives a candidate pattern with all 0's (i.e., this candidate pattern matches the pixel window if the pixel window is blank). The pattern matching module 42 inverts the pattern, so that a match signal is generated if there is non-zero value anywhere in the pixel window. If a match signal is generated, the data modification module 60 is configured to create the fixer color plane of the target pixel of the contone image 14 with a desired fixer tone.

In an embodiment, the pixel window used for the fixer bloom operation is different from another pixel window used for the black depletion operation, the black fortification operation, and/or the bleed reduction operation. Accordingly, the threshold function module 20 and the window generation 30 generates a pixel window for the fixer bloom operation, which is different from another pixel window generated for the black depletion operation, the black fortification operation, and/or the bleed reduction operation.

Example Image Processing Operation: Text Merge

In an embodiment, it may be desirable to have relatively higher resolution text data in the printout of a contone image, while non-text data in the printout may be of relatively lower resolution. That may be achieved by, for example, merging the higher resolution text data with the relatively lower resolution non-text contone data in the contone image. This, for example, enables using high quality text without having to send down the entire image page at the higher resolution required by the text plane.

In an embodiment, text data is included in a text black (kt) color plane, which is one of the color planes CA, ..., CN, of the contone image 14. For processing the contone image 14 in the system 10, if the higher resolution kt color plane data is used for merging with lower resolution non-text color planes, resolution of various components of the system 10 needs to be increased, leading to a relatively higher cost of the system 10. Accordingly, in an embodiment, a lower resolution kt color plane is used for performing one or more image processing operations in the system 10, and the final merging of the higher resolution kt color plane is performed at a subsequent downstream stage (e.g., after the contone image 14 is processed by the system 10).

Figure 8:
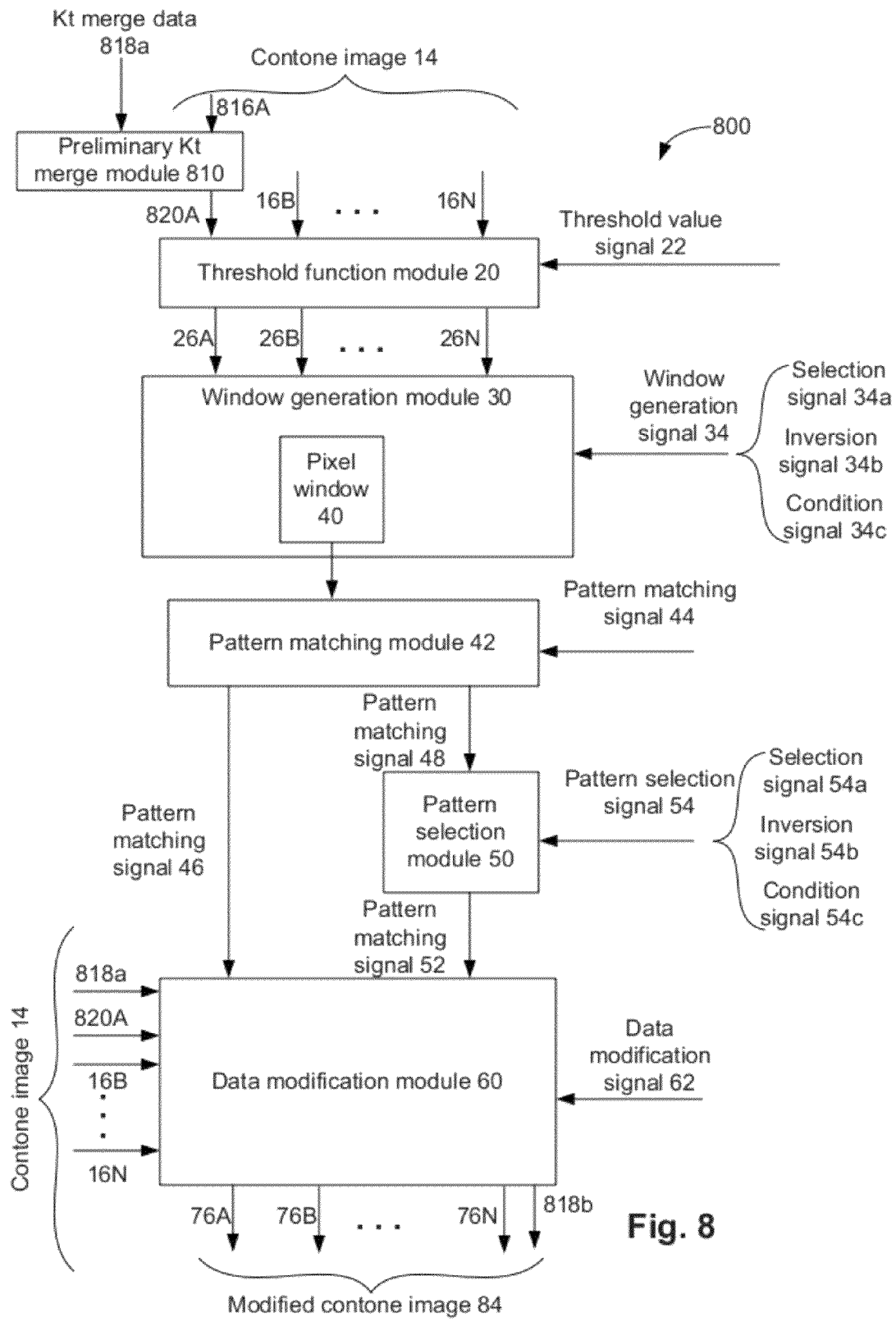
FIG. 8 schematically illustrates another image processing system, in accordance with various embodiments.

FIG. 8 schematically illustrates an image processing system 800 (referred to hereinafter as "system 800"), in accordance with various embodiments. Various components of the system 800 are similar to the corresponding components of the system 10, and accordingly, these components are identified using similar labels in FIGS. 1 and 8.

In an embodiment and unlike system 10, the system 800 includes a preliminary kt merge module 810. The original contone image 14 comprises color planes CA, ..., CN, where CA is the kt color plane. The pixel data of the kt color plane, for various pixels in the contone image 14, is labeled as 816A in FIG. 8. This data is a part of the contone image and is at the same resolution as the color planes 16B, ... 16N. In addition to kt plane 816A, preliminary kt merge module 810 also receives kt merge data 818*a*. The resolution of the kt pixel data 816A is, for example, higher than the resolution of the pixel data 16B, ..., 16N of the other color planes. For example, the pixel data 816A may be 600 dots per inch, while the pixel data 16B, ..., 16N may be 300 dots per inch. In addition, the bits per pixel of kt data plane 818*a* is often lower than that of kt plane 816A. For example, kt plane 816A may be 10 bits per pixel while kt merge data plane 818*a* may be only 1 or 2 bits per pixel. The preliminary kt merge module 810 modifies the pixel data 816A of the kt color plane, based on the kt merge data 818*a*, to generate modified kt pixel data 820A. The threshold function module 20 receives the modified kt pixel data 820A, and processes the contone image 14 (e.g., compares pixel data of various color planes with threshold levels) using the modified kt pixel data 820A. In an embodiment, the modified kt pixel data 820A has a resolution that is lower than the resolution of the kt merge data 818*a*. In an embodiment, the resolution of the modified kt pixel data 820A is equal to the resolution of the pixel data 16B, ..., 16N of the other color planes.

Based on the kt merge data 818*a* and the kt data plane 816A, the preliminary Kt merge module 810 will generate kt data plane 820A for use in the subsequent image processing operation. For example, if kt merge data 818*a* is 600 dpi, 1 bit per pixel, and kt data plane 816A is 300 dpi, 10 bits per pixel, the merge function may select an output value for modified kt pixel data 820A based on the number of bits that are set to 1 in a 2×2 array of 600 dpi pixels. If one pixel is set to 1, an output value of 256 could be sent to kt plane 820A. For 2 pixels, a value of 512, for 3 pixels a value of 768 and for 4 pixels a value of 1023 could be used for the output. This allows the higher resolution kt merge data 818*a* to be reduced to the same resolution as color planes 16B, ... 16N. If there is existing kt data in kt plane 816A, then the preliminary merge module 810 can combine the existing data with the data generated from kt merge data 818*a*. For example, it could process the kt merge values as described above and then choose to add the selected output to the value in kt data plane 816A, or it could take the maximum of the two values, etc. Because kt merge module 810 has reduced the resolution of the kt merge data for use in the pattern matching and data modification operations, this is considered a preliminary merge operation. Kt merge data 818*a* is propagated unchanged (e.g., labeled as Kt merge data 818*b* in the modified contone image 84 in FIG. 8) for a final merge operation later in the image processing flow.

In an embodiment, the data modification module 60 also receives the kt merge data 818*a* and the modified kt pixel data 820A, and outputs the kt merge data 818*b* along with the pixel data 76A, ..., 76N. In an embodiment, the kt merge data 818*b* is used to merge (e.g., in a downstream merge module, not illustrated in FIG. 1, which processes the modified contone image 84 subsequent to the system 10) the high resolution kt color plane with the pixel data 76B, ..., 76N of the modified contone image 84, subsequent to the processing in the system 800, based on, for example, the pixel data 76A of the kt color plane. Thus, the preliminary kt merge module 810 helps in processing the kt color plane pixel data in lower resolution in the system 800, while ensuring that the higher resolution kt color plane pixel data is eventually merged with color plane pixel data at a later stage in the downstream merge module.

Example Image Processing Operation: Text Enhancement

A text enhancement operation operates on relatively lower resolution black text data, and scales the relatively lower resolution black text data to a relatively higher resolution. The text enhancement operation also aims to smooth the edges of the black text data to give an appearance of higher resolution text. In an embodiment, the text enhancement operation is performed in the system 800 on the modified kt pixel data 820A. In another embodiment, the text enhancement operation is performed in the system 10 on original kt pixel data.

During the text enhancement operation, the Kt pixel data received at the threshold function module 20 (e.g., of the system 10 or 800) is searched (e.g., by the pattern matching module 42) for edge patterns that need smoothing. Whenever such edge is determined by the pattern matching module 42, a 2×2 array of kt merge data 818*b* is generated by the data modification module (e.g., in such a case, the kt merge data 818*b* is different from the kt merge data 818*a*). The downstream merge module (not illustrated in FIG. 1, and which processes the modified contone image 84 subsequent to the system 10) subsequently creates a smoothed version of the Kt color plane by combining the Kt contone plane 76A with the generated kt merge data 818*b*.

In an embodiment, in order to maintain a line width of text data, it may be desirable to selectively add or remove pixels from Kt color plane edges. The data modification module 60, for example, outputs a pixel data of 0 for the kt plane 76A at locations where pixels are to be removed from the merged kt plane and outputs a 1 in generated kt merge data 818*b* for those locations where pixels will remain. This, for example, allows the downstream merge module to use a "0" in the kt pixel data to leave the corresponding kt pixel data unchanged, and use a "1" to merge Kt pixel data with other color planes.

In an embodiment, as the kt merge process may place data in only part of a 2×2 array and this array may have tone in another color plane, a "1" in a center cell of the 2×2 array may be considered to be one pixel away from an edge of a black area. This results in a use of the previously discussed bleed reduction operation for one pixel away scenario.

In an embodiment, if both the text enhancement and text merge operations are enabled in the system 800, one of the text enhancement and text merge operations may need to have a priority over another of the text enhancement and text merge operations. For example, the kt output data has a same format for both the text merge operation and the text enhancement operation. If the text merge operation in the system 800 is enabled, the original kt pixel data is received by the system 800, is pre-merged using the preliminary kt merge module 810, and the original kt pixel data is output in the modified contone image 84. On the other hand, if the text enhancement operation is enabled, the system 800 may not need the pre-merged version of the original kt pixel data. Rather, during the text enhancement operation, the system 800 uses the original kt pixel data 816A and outputs the modified kt pixel data 76A, along with the generated kt merge data 818b as part of modified contone image 84.

Image Processing in Halftone Space

Figure 9:
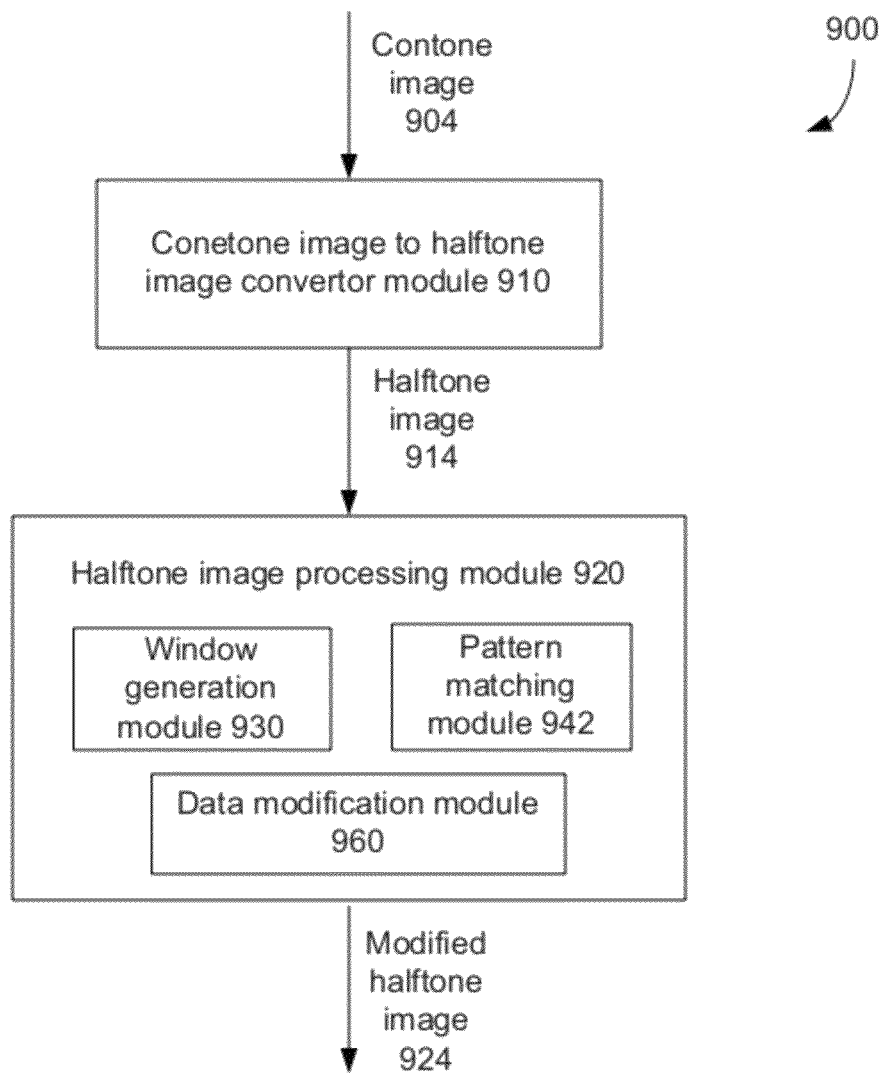
FIG. 9 schematically illustrates an image processing system for performing one or more image processing operations in a halftone space, in accordance with various embodiments.

The systems 10 and 800 operate in contone space, and perform various image processing operations on the contone image 14. In an embodiment, one or more image processing operations may also be performed on a halftone image. FIG. 9 schematically illustrates an image processing system 900 (referred to hereinafter as "system 900") for performing one or more image processing operations in halftone space, in accordance with various embodiments. The system 900 is included, for example, in a printing device (not illustrated in FIG. 9).

The system 900 includes a contone image to halftone image convertor module 910 that is configured to receive a contone image 904. In an embodiment, the contone image 904 may have previously undergone one or more image processing operations by, for example, the systems 10 and/or 800.

The contone image to halftone image convertor module 910 converts the contone image 904 to a corresponding halftone image 914 using any appropriate method. In an embodiment and although not illustrated in FIG. 9, the contone image to halftone image convertor module 910 is external to the system 900 (e.g., in such an embodiment, the system 900 directly receives the halftone image 914). The system 900 also includes a halftone image processing module 920 (also referred to herein as "module 920") configured to receive the halftone image 914, perform one or more image processing operations on the halftone image 914, and generate a modified halftone image 924.

In an embodiment, the halftone image 914 includes a plurality of pixels, each pixel associated with a plurality of color planes, e.g., color planes HA, . . . , HM, where M is an appropriate integer. In an example, the halftone image 914 includes cyan, magenta, yellow, black, text black, gloss and/or any other appropriate color planes.

Pixel data of a pixel of the halftone image 914, for a given color plane, is represented by, for example, 1 bit or 2 bits (or any other appropriate number of bits). In the system 10 of FIG. 1, pixel data of each pixel is compared with one or more threshold levels, to generate the plurality of color plane pixel windows for the plurality of color planes, where each pixel in a color plane pixel window is represented by one bit, two bits, or the like. However, as the number of bits in the pixel data of a pixel of the halftone image 914 is already relatively low (e.g., 1 or 2 bits), in an embodiment, the module 920 may not separately generate color plane pixel windows. In such an embodiment, the pixel data of various pixels of the halftone image 914 for a color planes are used as a color plane pixel window for the color plane.

The halftone image processing module 920 includes a window generation module 930, a pattern matching module 942, and a data modification module 960. In an embodiment, each of the window generation module 930, the pattern matching module 942, and the data modification module 960 operates in part similar to the corresponding modules of the systems 10 and/or 800. For example, the window generation module 930 receives the pixel data of various pixels for various color planes, and generates a corresponding pixel window. The pattern matching module 942 compares the generated pixel window with a plurality of candidate patterns, and generates a pattern matching signal based on the comparison. The data modification module 960 modifies the halftone image 914 based on the pattern matching signal, and generates the modified halftone image 924.

Example Image Processing Operation in the
Halftone Space Using the System 900: Bleed
Reduction Similar to the previously discussed bleed reduction in the contone space, the bleed reduction operation in the halftone space aims to reduce an amount of color and/or black ink in an area that is near a black edge (but outside a corresponding black area) in the halftone image 914.

For the bleed reduction operation, the window generation module 930 generates a pixel window from the pixel data of various pixels for the black color plane. The generated pixel window is compared (e.g., by the pattern matching module 942) to a plurality of candidate patterns. For example, the pattern matching module 942 searches for an edge of a black area in the vicinity of a target pixel in the pixel window, and determines how far the target pixel is from the edge. The candidate patterns, which are compared to the pixel window, are, for example, similar to the candidate patterns of FIGS. 6A-6D and/or 7A-7D.

Similar to the matching operation performed by the pattern matching module 42 of the systems 10 and/or 800, the pattern matching module 942 determines if a target pixel is near an edge of a black area. The pattern matching module 942 also determines if the target pixel is one pixel away, two pixels away, or three pixels away (or any other number of pixels away) from the edge. If the target pixel is near the edge (i.e., one, two or three pixels away from the edge), based on the distance of the target pixel from the edge, the data modification module 924 modifies the halftone image 914.

In the previously discussed bleed reduction operation in the contone space, pixel data of the target pixel was reduced by, for example, 25%, 40% or 70% based on the distance of the target pixel from the edge. This is possible because, pixel data of the target pixel for various color planes in the contone image 14 is represented by, for example, 10 bits (i.e., ranges from 0 to 1023). However, pixel data of a target pixel for various color planes in the halftone image 914 are represented by, for example, 1 bit or 2 bits. So, it is generally not possible to reduce the pixel data of the target pixel for a color plane in the halftone image 914 by 25%, 40% or 70%.

In an embodiment, a dither matrix is used to reduce the pixel data of various pixels in the halftone image 914 for the bleed reduction operation. A dither matrix includes a plurality of pixels, each pixel having 1 bit or 2 bits pixel data for a corresponding color plane. As an example, if it is desired to have a 25% tone for a color plane in an area of a halftone image, a corresponding dither matrix is used, in which about 25% pixels have a value of 1's or are turned on (i.e., ink is deposited for these pixels while printing the image), and about 75% pixels have a value of 0's or are turned off (i.e., ink is not deposited for these pixels while printing the image). Similarly, dither matrices corresponding to 40%, 70%, or any other appropriate percentage of a tone of a halftone image for one or more color planes may be used.

In an embodiment, during the bleed reduction operation, if it is determined that a target pixel is one pixel away from a black edge, it is desired to reduce the pixel data of the target pixel to, for example, 25% tone for a color plane (e.g., cyan, magenta, or yellow color plane). Accordingly, a dither matrix corresponding to 25% tone for the color plane is used. The pixel data of the dither matrix, for example, replaces the pixel data of the target pixel and neighboring pixels for the color plane, so that about 25% tone for the color plane is present on or near the vicinity of the target pixel in the modified halftone image 924. In an embodiment, similar bleed reduction operations are carried out if the target pixel is two pixels away or three pixels away from an edge (e.g., by using dither matrices corresponding to 40% and 70% tones, respectively, for the color plane).

In an embodiment, pixel data of one or more non-black color planes (e.g., cyan, magenta and/or yellow color planes) are reduced as a part of the bleed reduction operation, and pixel data of the black color plane are not reduced (e.g., to maintain sharp and crisp edges of text and other black areas).

Example Methods of Operation

Figure 10:
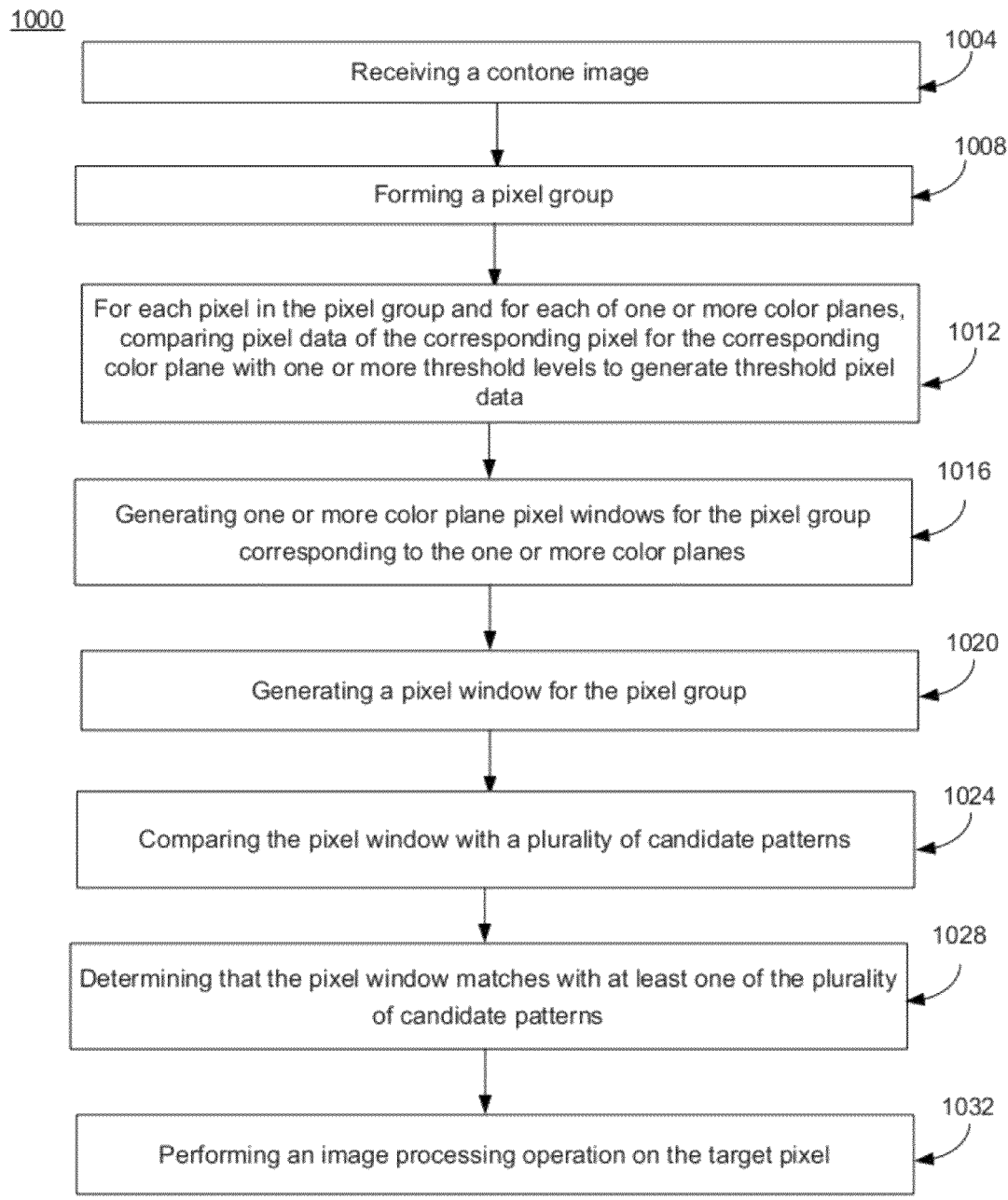
FIG. 10 illustrates an example of a method for operating the image processing systems of FIGS. 1 and/or 8, in accordance with various embodiments.

FIG. 10 illustrates an example of a method 1000 for operating the systems 10 and/or 800, in accordance with various embodiments. At 1004, the threshold function module 20 receives the contone image 14. The contone image 14 comprises a plurality of pixels, each pixel of the plurality of pixels comprising pixel data associated with a plurality of color planes (e.g., color planes CA, . . . , CN).

At 1008, the threshold function module 20 forms a pixel group (e.g., the pixel group 204 of FIG. 2). The pixel group includes a target pixel (e.g., the target pixel A34) and a plurality of pixels that are neighboring to the target pixel. At 1012, for each pixel in the pixel group and for each of one or more color planes of the plurality of color planes, the threshold function module 20 compares pixel data of the corresponding pixel for the corresponding color plane with one or more threshold levels to generate threshold pixel data.

At 1016, based on the threshold pixel data of the pixels in the pixel group for the one or more color planes, the threshold function module 20 generates one or more color plane pixel windows for the pixel group corresponding to the one or more color planes. At 1020, based on the one or more color plane pixel windows, the window generation module 30 generates a pixel window (e.g., pixel window 40 of FIG. 4) for the pixel group 204.

At 1024, the pattern matching module 42 compares the pixel window with a plurality of candidate patterns (e.g., the candidate patterns of FIGS. 5A-5C). At 1028, the pattern matching module 42 determines that the pixel window matches with at least one of the plurality of candidate patterns. Based on determining that the pixel window matches with at least one of the plurality of candidate patterns, at 1032, the data modification module 60 performs an image processing operation on the target pixel. In an embodiment, the image processing operation comprises one of a black depletion operation, a black fortification operation, a fixer bloom operation, a bleed reduction operation, a text merge operation, a text enhancement operation, and the like.

Figure 11:
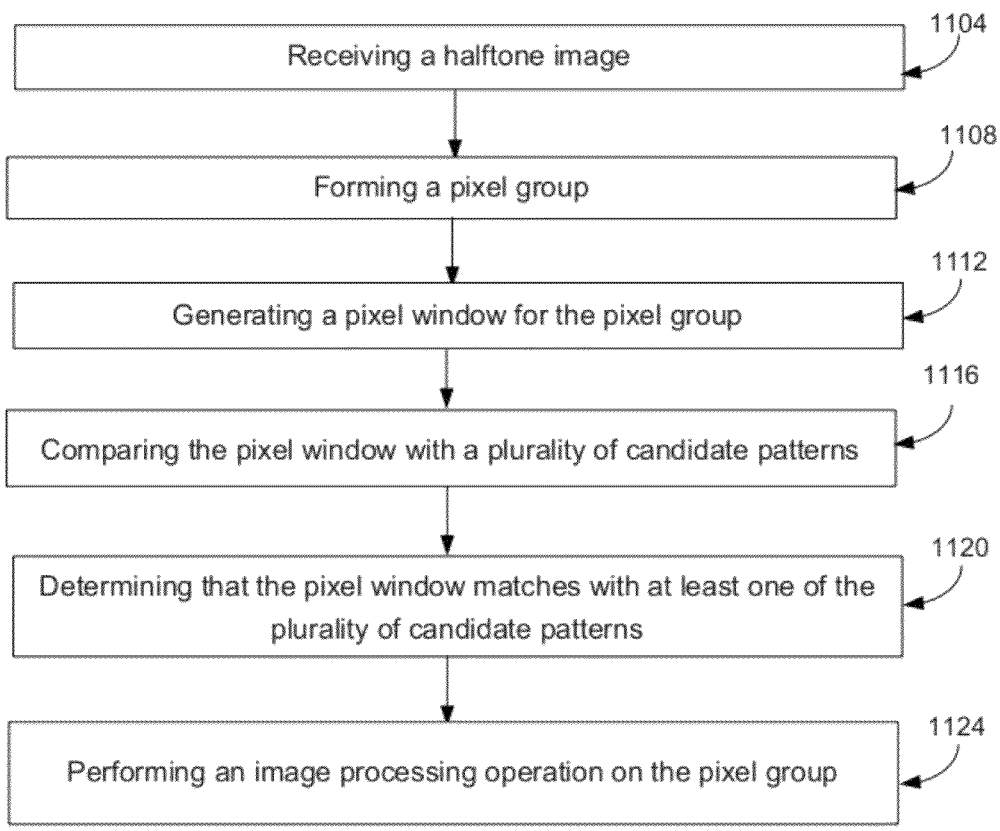
FIG. 11 illustrates an example of a method for operating the system of FIG. 9, in accordance with various embodiments.

FIG. 11 illustrates an example of a method 1100 for operating the system 900, in accordance with various embodiments. At 1104, the halftone image processing module 920 receives a halftone image (e.g., halftone image 914). The halftone image comprises a plurality of pixels, each pixel of the plurality of pixels including pixel data associated with a plurality of color planes. At 1108, the window generation module 930 forms a pixel group. In an embodiment, the pixel group includes (i) a target pixel and (ii) one or more pixels that are neighboring to the target pixel. At 1112, the window generation module 930 generates a pixel window for the pixel group. At 1116, the pattern matching module 942 compares the pixel window with a plurality of candidate patterns. At 1120, the pattern matching module 942 determines that the pixel window matches with at least one of the plurality of candidate patterns. Based on determining that the pixel window matches with at least one of the plurality of candidate patterns, at 1124, the data modification module 960 performs an image processing operation on the pixel group. In an embodiment, the image processing operation comprises a bleed reduction operation.

In accordance with an embodiment, an article of manufacture may be provided that includes a storage medium having instructions stored thereon that, if executed, result in the operations described herein with respect to the methods 1000 and 1100 of FIGS. 10 and 11 (and/or various other operations discussed in the present disclosure). In an embodiment, the instructions, if executed, result in the operations performed by the systems 10, 800 and/or 900. In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the terms "embodiment" or "embodiments," which may each refer to one or more of the same or different embodiments. Furthermore, the terms "comprising," "including," "having," and the like, as used with respect to embodiments, are synonymous.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
receiving, by a halftone image processing module of a printing device, a halftone image, wherein the halftone image comprises a plurality of pixels, wherein each pixel of the plurality of pixels of the halftone image includes pixel data associated with a plurality of color planes;
forming a pixel group, wherein the pixel group includes (i) a target pixel of the plurality of pixels, and (ii) one or more pixels of the plurality of pixels that are neighboring to the target pixel;
generating a pixel window for the pixel group;
comparing the pixel window with a plurality of candidate patterns;
determining that the pixel window matches with at least one of the plurality of candidate patterns; and
based on determining that the pixel window matches with at least one of the plurality of candidate patterns, performing an image processing operation on the pixel group of the halftone image, wherein performing the image processing operation further comprises reducing a tone of one or more color planes of a subset of pixels in the pixel group, wherein reducing the tone of one or more color planes of the subset of pixels in the pixel group further comprises
selecting a dither matrix from a plurality of dither matrices, wherein each dither matrix of the plurality of dither matrices (i) is associated with a corresponding color plane, and (ii) comprises a plurality of pixels, wherein each pixel of a dither matrix of the plurality of dither matrices has one or more bits of pixel data for the corresponding color plane, and
replacing the subset of pixels in the pixel group in the halftone image with the plurality of pixels from the selected dither matrix.

2. The method of claim 1, wherein the image processing operation is a bleed reduction operation.

3. The method of claim 1, wherein each of the plurality of candidate patterns include (i) a black area and (ii) an edge of the black area.

4. The method of claim 1, further comprises:
based on determining that the pixel window matches with at least one of the plurality of candidate patterns, determining a distance between (i) the target pixel and (ii) an edge of a black area in the pixel group.

5. The method of claim 4, wherein performing the image processing operation further comprises:
based on the distance between (i) the target pixel and (ii) the edge of the black area, performing the image processing operation.

6. The method of claim 5, wherein an amount of reduction of the tone is inversely proportional to the distance between (i) the target pixel and (ii) the edge of the black area.

7. The method of claim 1, wherein the one or more color planes, for which the tone is reduced, excludes a black color plane.

8. An image processing system for processing a halftone image comprising a plurality of pixels, wherein each pixel of the plurality of pixels includes pixel data associated with a plurality of color planes, the image processing system comprising:
a memory;
a window generation module configured to
form a pixel group, wherein the pixel group includes (i) a target pixel of the plurality of pixels and (ii) one or more pixels of the plurality of pixels that are neighboring to the target pixel, and
generate a pixel window for the pixel group;
a pattern matching module configured to
compare the pixel window with a plurality of candidate patterns, and
determine that the pixel window matches with at least one of the plurality of candidate patterns; and
a data modification module configured to, based on determining that the pixel window matches with at least one of the plurality of candidate patterns, perform an image processing operation on the pixel group by reducing a tone of one or more color planes of a subset of pixels in the pixel group, wherein the data modification module is configured to reduce the tone of the one or more color planes of the subset of pixels in the pixel group by
selecting a dither matrix from a plurality of dither matrices, wherein each dither matrix of the plurality of dither matrices (i) is associated with a corresponding color plane, and (ii) comprises a plurality of pixels, wherein each pixel of a dither matrix of the plurality of dither matrices has one or more bits of pixel data for the corresponding color plane, and
replacing the subset of pixels in the pixel group in the halftone image with the plurality of pixels from the selected dither matrix.

9. The image processing system of claim 8, wherein the image processing operation is a bleed reduction operation.

10. The image processing system of claim 8, wherein each of the plurality of candidate patterns include (i) a black area and (ii) an edge of the black area.

11. The image processing system of claim 8, wherein the pattern matching module is further configured to, based on determining that the pixel window matches with at least one of the plurality of candidate patterns, determine a distance between (i) the target pixel and (ii) an edge of a black area in the pixel group.

12. The image processing system of claim 11, wherein the data modification module is configured to perform the image processing operation on the pixel group, based on the distance between (i) the target pixel and (ii) the edge of the black area.

13. The image processing system of claim 12, wherein an amount of reduction of the tone is inversely proportional to the distance between (i) the target pixel and (ii) the edge of the black area.

14. The image processing system of claim 8, wherein the one or more color planes, for which the tone is reduced, excludes a black color plane.

* * * * *